(12) United States Patent
Erike

(10) Patent No.: US 7,776,160 B2
(45) Date of Patent: *Aug. 17, 2010

(54) METHOD OF PRODUCING A COLD TEMPERATURE HIGH TOUGHNESS STRUCTURAL STEEL TUBING

(75) Inventor: Eric C. Erike, Mesa, AZ (US)

(73) Assignees: TRW Automotive U.S. LLC, Livonia, MI (US); Sumitomo Metal Industries Ltd., Osaka (JP)

( * ) Notice: Subject to any disclaimer, the term of this patent is extended or adjusted under 35 U.S.C. 154(b) by 30 days.

This patent is subject to a terminal disclaimer.

(21) Appl. No.: 10/726,961

(22) Filed: Dec. 3, 2003

(65) Prior Publication Data

US 2004/0074570 A1    Apr. 22, 2004

Related U.S. Application Data

(63) Continuation of application No. 09/944,873, filed on Aug. 31, 2001, now abandoned, which is a continuation-in-part of application No. 09/654,153, filed on Sep. 1, 2000, now Pat. No. 6,386,583.

(51) Int. Cl.
  C21D 7/13       (2006.01)
  C21D 9/08       (2006.01)
  C21D 1/42       (2006.01)

(52) U.S. Cl. ............ 148/320; 148/332; 148/334; 148/335; 148/909; 148/593; 148/570

(58) Field of Classification Search ............ 148/320, 148/334, 335, 590, 593, 570, 332, 909
See application file for complete search history.

(56) References Cited

U.S. PATENT DOCUMENTS

| | | | |
|---|---|---|---|
| 3,645,725 A | 2/1972 | Denhard, Jr. et al. | |
| 4,765,953 A | 8/1988 | Hagenfeldt et al. | |
| RE33,006 E | 8/1989 | Hataya et al. | |
| 4,892,704 A | 1/1990 | Sawaragi | |
| 5,348,344 A | 9/1994 | Blumenthal et al. | |
| 5,938,865 A * | 8/1999 | Kondo et al. ............ | 148/593 |
| 6,024,808 A * | 2/2000 | Kondo et al. ............ | 148/593 |
| 6,173,495 B1 * | 1/2001 | Erike ..................... | 29/890.14 |

(Continued)

FOREIGN PATENT DOCUMENTS

JP        401100222    *   4/1989

(Continued)

OTHER PUBLICATIONS

The ASM Handbook, vol. 4, Heat Treating, 1991, p. 164.*

(Continued)

*Primary Examiner*—George Wyszomierski
*Assistant Examiner*—Tima M McGuthry-Banks
(74) *Attorney, Agent, or Firm*—Tarolli, Sundheim, Covell & Tummino LLP

(57) ABSTRACT

An apparatus (10) includes a low-carbon steel tube (24). The low-carbon steel tube (24) yields plastically more than about 5% before fracturing at temperatures down to about −40° C. when stress is applied to the low-carbon steel tube sufficient to cause the low carbon steel tube to so yield.

6 Claims, 3 Drawing Sheets

U.S. PATENT DOCUMENTS 6,290,789 B1 * 9/2001 Toyooka et al. ............. 148/593
6,386,583 B1 5/2002 Erike
6,878,219 B2 4/2005 Kondo et al.

FOREIGN PATENT DOCUMENTS

| JP | 402050915 | * | 2/1990 |
| JP | 406184635 | * | 7/1994 |
| JP | 409104921 | * | 4/1997 |
| JP | 409111344 | * | 4/1997 |
| JP | 410140238 | * | 5/1998 |
| JP | 410140283 | * | 5/1998 |

OTHER PUBLICATIONS

Derwent ACC-No. 1980-63099C English abstract of JP 55097423 A published Jul. 24, 1980.*

Metals Handbook, Ninth Edition: vol. 14 Forming and Forging. Davis et al, ed. 1988. pp. 330 and 335.*

Treatise entitled "Worldwide Guide to Equivalent Irons and Steels", pp. iii-iv , 5-1 to 5-10, and 5-135-5-137, (ASM Intl. $3^{rd}$ ed, 1993).

Treatise entitled "Understanding How Components Fail", pp. 83-84, (ASM Intl. $2^{nd}$ ed, 2000).

Treatise entitled "ASM Specialty Handbook: Carbon and Alloy Steels", pp. 15-22 and 230-232, (ASM Intl. 1996).

* cited by examiner

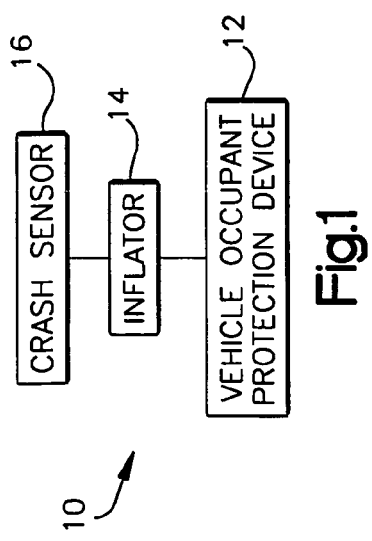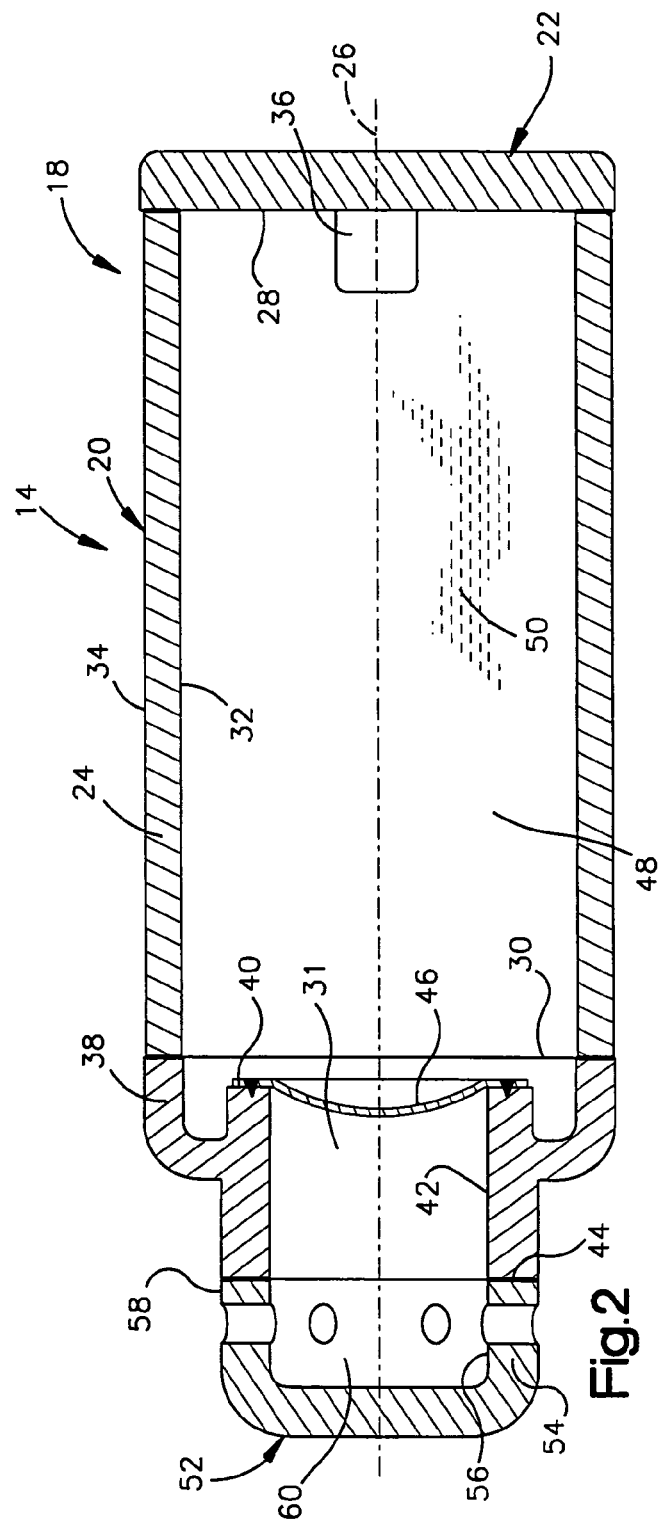

METHOD OF PRODUCING A COLD TEMPERATURE HIGH TOUGHNESS STRUCTURAL STEEL TUBING

The present invention is a continuation of U.S. patent application Ser. No. 09/944,873 now abandoned, filed Aug. 31, 2001 which is a continuation-in-part of U.S. patent application Ser. No. 09/654,153 now U.S. Pat. No. 6,386,583, filed Sep. 1, 2000 and assigned to the assignee of the present invention.

FIELD OF THE INVENTION

The present invention relates to a method of producing steel tubing having high toughness at low temperatures and to a cold temperature high toughness steel tube formed by the method. The steel tube is suitable for storing gas under pressure such as in an inflator for storing gas for inflating an inflatable vehicle occupant protection device.

BACKGROUND OF THE INVENTION

An inflator for inflating an inflatable vehicle occupant protection device includes a quantity of a stored gas and a body of combustible material stored in an inflator housing. An igniter is actuatable to ignite the body of combustible material. As the body of combustible material burns, the combustion products heat the stored gas. The heated stored gas and the combustion products form an inflation fluid for inflating the vehicle occupant protection device. Another inflator includes a stored inert gas and a stored combustible gas, such as hydrogen. An igniter ignites the combustible gas, which heats the stored inert gas.

An inflator housing can be formed from steel. The steel used to form the inflator housing must have sufficient tensile strength to store the compressed gas at an elevated pressure. The steel must also have a toughness sufficient to prevent brittle fracture of the inflator housing when the inflator housing is subjected to temperatures down to about −40° C.

SUMMARY OF THE INVENTION

The present invention relates to an apparatus that comprises a low-carbon steel tube. The low-carbon steel tube yields plastically more than about 5% before fracturing at temperatures down to about −40° C. when stress sufficient to cause the low carbon steel tube to so yield is applied to the low-carbon steel tube.

Another aspect of the present invention relates to a method of forming a low-carbon steel tube. In the method, a billet that has a diameter is cast from a low-carbon steel that consists essentially of, by weight, about 0.07% to about 0.12% carbon, about 0.70% to about 1.60% manganese, up to about 0.020% phosphorous, up to about 0.015% sulfur, about 0.06% to about 0.35% silicon, about 0.25% to about 1.20% chromium, up to about 0.65% nickel, about 0.20% to about 0.70% molybdenum, up to about 0.35% copper, about 0.02% to about 0.06% aluminum, up to about 0.05% vanadium, up to about 0.25% residual elements, and the balance iron. The diameter of the billet of low-carbon steel is reduced by hot-rolling the billet. A tube is formed having an annular wall by piercing the billet. The thickness of the annular wall is reduced by cold drawing the tube. The tube is heat treated after the cold drawing. A low-carbon steel tube is formed that yields plastically more than about 5% before fracturing at temperatures down to about −40° C. when stress sufficient to cause said low-carbon steel tube to so yield is applied to the low-carbon steel tube.

BRIEF DESCRIPTION OF THE DRAWINGS

The foregoing and other features of the invention will become more apparent to one skilled in the art upon consideration of the following description of the invention and the accompanying drawings in which:

FIG. 1 is a schematic view of a vehicle occupant protection apparatus embodying the present invention;

FIG. 2 is a sectional view of part of the apparatus of FIG. 1;

DESCRIPTION OF PREFERRED EMBODIMENT

Figure 3:
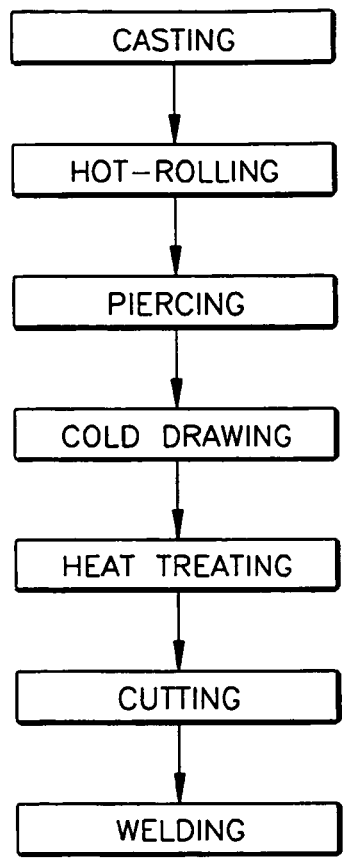
FIG. 3 is a schematic block diagram illustrating a method of producing a seamless tube in accordance with the present invention.

Referring to FIG. 1, a vehicle occupant protection apparatus 10 includes an inflatable vehicle occupant protection device 12. In the preferred embodiment of the present invention, the inflatable vehicle occupant protection device 12 is an air bag. The inflatable vehicle occupant protection device 12 could be for example an inflatable seat belt, an inflatable knee bolster, an inflatable head liner, an inflatable side curtain, or a knee bolster operated by an air bag.

An inflator 14 is associated with the vehicle occupant protection device 12. The inflator 14 is actuatable to direct inflation fluid to the inflatable vehicle occupant protection device 12 to inflate the inflatable vehicle occupant protection device 12.

The system also includes a crash sensor 16. The crash sensor 16 is a known device that senses a vehicle condition, such as vehicle deceleration, indicative of a collision. When the crash sensor 16 senses a vehicle condition for which inflation of the inflatable vehicle occupant protection device is desired, the crash sensor either transmits a signal or causes a signal to be transmitted to actuate the inflator 14. The inflatable vehicle occupant protection device 12 is then inflated and extends into the occupant compartment of the vehicle to help protect a vehicle occupant from a forceful impact with parts of the vehicle.

The inflator 14, in the preferred embodiment of the invention, is a heated gas inflator, such as disclosed in U.S. Pat. No. 5,348,344, to Blumenthal et al., entitled APPARATUS FOR INFLATING A VEHICLE OCCUPANT RESTRAINT USING A MIXTURE OF GASES, and assigned to TRW Vehicle Safety Systems Inc.

As shown in FIG. 2, the inflator 14 includes a housing 18. The housing 18 includes a container 20. The container 20 includes a generally annular side wall 24 extending along a central axis 26 between a first open end 28 of the annular side wall 24 and a second open end 30 of the annular side wall 24. The annular side wall 24 includes an annular inner surface 32 and an annular outer surface 34.

The housing 18 further includes an end cap 22 secured to the first open end 28 of the annular side wall 24 by a weld. The end cap 22 supports an actuatable pyrotechnic igniter 36. The igniter 36 includes suitable ignitable material (not shown).

The housing 18 also includes an end wall 38 secured to the second open end 30 of the annular side wall 24 by any suitable means, such as a weld. The end wall 38 includes a radially extending first surface 40 and an axially extending cylindrical surface 42. The surfaces 40 and 42 are centered on the axis 26. The cylindrical surface 42 of the end wall 38 has a diameter smaller than the diameter of the inner surface 32 of the annular side wall 24 and extends axially between and connects the first surface 40 of the end wall 38 and a radially extending second surface 44 of the end wall 38. The cylindrical surface 42 defines a passage 31 through the end wall 38.

A burst disk 46 is secured to the first surface 40 of the end wall 38 by any suitable means, such as a weld. The burst disk 46 closes the passage 31. Together, the burst disk 46 and the end wall 38 close the second open end 30 of the annular side wall 24 to define a closed chamber 48 in the container 20. The chamber 48 is defined by the end wall 38, the burst disk 46, the annular side wall 24, and the end cap 22.

A supply of gas 50 for inflating the inflatable vehicle occupant protection device 12 is stored in the chamber 48. The supply of gas 50 comprises at least one inert gas. The preferred inert gas is nitrogen, argon, or a mixture of nitrogen and argon.

The supply of gas 50 also includes an oxidizer gas and a combustible fuel gas. A preferred oxidizer gas is oxygen. Preferred fuel gases include hydrogen, nitrous oxide, and/or methane. Alternatively, the stored gas 50 may comprise a mixture of air and hydrogen.

Preferably, the stored gas 50 includes at least a small amount of a tracer gas, such as helium, for helping to detect gas leaks, as is known.

The stored gas 50 within the container 48 is under pressure. The pressure depends upon such factors as the volume of the inflatable vehicle occupant protection device 12 to be inflated, the time available for inflation, the inflation pressure desired, and the volume of the chamber 48 storing the gas. The stored gas 50 in the chamber 48 is typically at a pressure of about 2,000 to about 8,000 pounds per square inch (psi). Preferably, the stored gas 50 in the chamber 48 is at a pressure of about 3,000 psi to about 4,000 psi.

A diffuser 52 is connected to the second surface 44 of the end wall 38 by any suitable means, such as a weld. The diffuser 52 includes a cylindrical side wall 54 coaxial with the annular side wall 24 of the container 20 and centered on the axis 26. The side wall 54 includes a cylindrical inner surface 56 and cylindrical outer surface 58. The diffuser 52 has a central chamber 60. The chamber 60 is in fluid communication with the passage 31 in the end wall 38.

In accordance with a preferred embodiment of the present invention, the annular side wall 24 of the housing 18 comprises a seamless tube that is formed from a low-carbon steel. The low-carbon steel of the present invention is a high-strength steel that consists essentially of, by weight, about 0.07% to about 0.12% carbon, about 0.70% to about 1.60% manganese, up to about 0.020% phosphorous, up to about 0.015% sulfur, about 0.06% to about 0.35% silicon, about 0.25% to about 1.20% chromium, up to about 0.65% nickel, about 0.20% to about 0.70% molybdenum, up to about 0.35% copper, about 0.02% to about 0.06% aluminum, up to about 0.05% vanadium, up to about 0.25% residual elements, and the balance iron. By residual elements, it is meant the combined weight of additional elements including, for example, titanium, lead, niobium, cobalt, calcium, and/or tin.

Carbon increases the strength of the steel, but decreases the ductility of the steel and the resistance of the steel to hydrogen embrittlement and stress corrosion cracking. When the carbon content of the steel is less than about 0.07% by weight, the steel does not have sufficient strength to be used in the housing 18 of the inflator 14. When the carbon content is greater than about 0.12% by weight, the steel is too susceptible to hydrogen embrittlement and stress corrosion cracking to be used in the housing 18 of the inflator 14.

Manganese increases the strength and toughness of the steel, but decreases the ductility and resistance of the steel to hydrogen embrittlement and stress corrosion cracking. The manganese content is determined in relation to the carbon content. When the manganese content of the steel is less than about 0.70% by weight, the steel does not have sufficient strength and toughness to be used in the housing 18 of the inflator 14. When the manganese content is greater than about 1.60% by weight, the steel is too susceptible to hydrogen embrittlement and stress corrosion cracking to be used in the housing 18 of the inflator 14.

Phosphorous decreases the creep and rupture strength of the steel and resistance of the steel to hydrogen embrittlement. When the phosphorous content is greater than 0.020% by weight, the steel is too susceptible to hydrogen embrittlement to be used in the housing 18 of the inflator 14.

Sulfur, like phosphorous; decreases the creep and rupture strength of steel and resistance of the steel to hydrogen embrittlement. When the sulfur content is greater than 0.015% by weight, the steel is too susceptible to hydrogen embrittlement to be used in the housing 18 of the inflator 14.

Silicon increases the strength of the steel and the oxidation resistance of the steel. Silicon also decreases the workability (i.e., increases the work hardening rate) of the steel. When the silicon content of the steel is less than about 0.06% by weight, the steel is noticeably susceptible to oxidation during formation and welding of the steel. Oxidation of the steel degrades the strength and toughness of the steel. When the silicon content of the steel is greater than about 0.35% by weight, the workability of the steel degrades so that the steel cannot be readily processed into the housing 18 of the inflator 14.

Chromium increases the corrosion resistance and oxidation resistance of the steel, but decreases the workability (i.e., increases the work hardening rate) of the steel. When the chromium content of the steel is less than about 0.25% by weight, the steel is noticeably susceptible to corrosion and oxidation. When the chromium content of the steel is greater than about 1.20% by weight, the workability of the steel degrades so that the steel cannot be readily processed into the housing 18 of the inflator 14.

Nickel increases the ductility of the steel and corrosion resistance of the steel, but decreases the workability (i.e., increases the work hardening rate) of the steel. When the nickel content of the steel is greater than about 0.65% by weight, the workability of the steel degrades so that the steel cannot be readily processed into the housing 18 of the inflator 14.

Molybdenum increases the corrosion resistance and oxidation resistance of the steel, but decreases the workability (i.e., increases the work hardening rate) of the steel. The molybdenum content is determined in relation with the chromium content. When the molybdenum content of the steel is less than about 0.20% by weight, the steel is noticeably susceptible to corrosion and oxidation. When the molybdenum content is greater than about 0.70% by weight, the workability of the steel degrades so that the steel cannot be readily processed into the housing 18 of the inflator 14.

Copper increases the corrosion resistance of steel, but decreases the resistance of the steel to stress corrosion cracking. When the copper content of the steel is greater than about 0.35% by weight, the steel is too susceptible to stress corrosion cracking to be used in the housing 18 of the inflator 14.

Aluminum improves the corrosion resistance, the workability, and ductility of the steel. When the aluminum content of the steel is at least about 0.02% by weight, the corrosion resistance, workability, and ductility of the steel noticeably increase. When the aluminum content of the steel is greater than about 0.06% by weight, the workability of the steel degrades so that the steel cannot be readily processed into the housing 18 of the inflator 14.

Vanadium increases the corrosion resistance and abrasion resistance of the steel. When the vanadium content is greater than about 0.05%, the workability of the steel degrades so that the steel cannot be readily processed into the housing 18 of the inflator 14.

FIG. 3, is a schematic illustration of a method of producing the seamless tube of low-carbon steel. In the method, a cylindrical billet is cast from the low-carbon steel of the present invention. The cylindrical billet of low-carbon steel has a uniform diameter along the entire length of the billet. The diameter of the cylindrical billet is about 150 mm to about 200 mm.

The cast cylindrical billet of low-carbon steel is hot rolled to reduce the diameter of the cylindrical billet. Hot-rolling involves passing a heated cylindrical billet of steel through a rolling mill. A rolling mill typically has two rolls revolving at the same peripheral speed and in opposite directions about their respective axes, i.e., clockwise and counter clockwise. Each roll has an annular groove. The annular grooves are aligned with each other and define a round pass with a diameter somewhat less than the diameter of the cylindrical billet of steel passing between the rolls. In operation, the rolls grip the cylindrical billet of steel and deliver it reduced in diameter and increased in length.

In the present invention, the cylindrical billet of low-carbon steel is heated to a temperature of about 900° C. to about 1200° C. and, while at the temperature of about 900° C. to about 1200° C., is passed through the rolling mill. Preferably, the cylindrical billet is heated to a temperature of about 1200° C. and, while at a temperature of about 1200° C., is passed through the rolling mill.

The cylindrical billet of low-carbon steel is passed through the rolling mill at least once to reduce the diameter of the cylindrical billet. The diameter of the cylindrical billet of low-carbon steel may be reduced in multiple passes through the rolling mill, with each pass slightly reducing the diameter of the cylindrical billet.

The diameter of the cylindrical billet of low-carbon steel is preferably reduced at least about 50% during the hot-rolling step of the present invention. For example, the diameter of a cylindrical billet can be reduced by hot-rolling from about 190 mm to about 75 mm.

The hot-rolled cylindrical billet of low-carbon steel is formed into a seamless tube by passing the cylindrical billet through a known piercing mill. In the present invention, the cylindrical billet of low-carbon steel is heated to an elevated temperature and, while at the elevated temperature, is passed through the piercing mill. Preferably, the cylindrical billet is heated to a temperature of about 1000° C. to about 1500° C. and, while at a temperature of about 1000° C. to about 1500° C., the cylindrical billet is passed through the piercing mill.

The seamless tube of low-carbon steel so formed has an annular wall with a thickness uniform along the axis of the tube and circumferentially around the tube. The outer diameter of the annular wall is substantially less than the diameter of the hot-rolled cylindrical billet. The length of the seamless tube is substantially longer than the length of the hot-rolled cylindrical billet.

The seamless tube of low-carbon steel is cooled to room temperature by quenching the tube with sprayed water and then placing the tube in an air atmosphere, which is at room temperature. By "room temperature", as used in the specification and the claims, it is meant a temperature that is less than about 100° C. and, preferably, a temperature that is about 22° C. Once the temperature of the tube is at room temperature, the tube may be pickled in an acid solution to remove any scale or oxides formed during piercing on the inner or outer surface of the annular wall. Suitable pickling solutions may include sulfuric acid, phosphoric acid, nitric acid, hydrochloric acid, and combinations thereof.

The annular wall of the seamless tube of low-carbon steel is then reduced in thickness by cold drawing the seamless tube. Cold drawing involves pulling a tube, which has not been heated to an elevated temperature, through a die, the hole of which is smaller than the outer diameter of the tube being drawn. At the same time, the inner surface of the tube is supported by a mandrel anchored on the end of a rod so that the tube remains in the plane of the die during the drawing operation.

The seamless tube of low-carbon steel is passed through the die at least once to reduce in thickness the annular wall of the seamless tube. The annular wall of the seamless tube may be reduced in thickness by multiple passes of the tube through the die with each pass slightly reducing the thickness of the annular wall.

The seamless tube of low-carbon steel in the present invention may be lubricated with an oil based or water based emulsion prior to cold drawing in order to reduce the heat generated by friction as the seamless tube passes through the die.

The thickness of the annular wall after cold drawing is uniform along the axis of the tube and circumferentially around the tube. The thickness of the annular wall is substantially less than the thickness of the annular wall prior to cold drawing.

The seamless tube of low-carbon steel after cold drawing preferably has an outer diameter of about 55 mm to about 65 mm and a wall thickness of about 2.5 mm to about 4 mm. More preferably, the seamless tube of low-carbon steel, after cold drawing, has an outer diameter of about 60 mm and a wall thickness of about 3 mm.

The seamless tube of low-carbon steel is polished to remove objectionable pits and surface blemishes and then heat treated to improve the toughness of the seamless tube at low temperatures, i.e., temperatures down to about −40° C.

Figure 4:
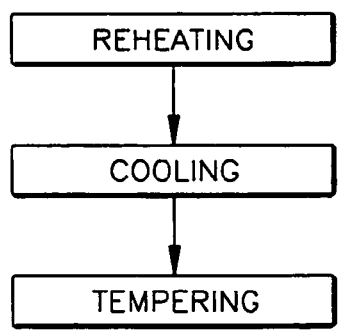
FIG. 4 is a schematic block diagram illustrating one embodiment of the heat treatment step of FIG. 3.

In one embodiment of the present invention, as illustrated schematically in FIG. 4, the seamless tube of low-carbon steel is heat treated by transferring the seamless tube to a heating chamber of a reheating furnace and heating the seamless tube to a temperature of at least about 900° C. and, preferably, about 920° C. The heat is supplied to the heating chamber of the reheating furnace by combusting a gaseous or liquid fuel.

The seamless tube of low-carbon steel is maintained at a temperature of at least about 900° C. within the heating chamber for at least about 15 minutes. Preferably the seamless tube is maintained at a temperature of at least about 900° C. within the heating chamber for at least about 20 minutes.

The seamless tube of low-carbon steel after being heated within the chamber for at least about 15 minutes is cooled to room temperature. The seamless tube of low-carbon steel is preferably cooled to room temperature by quenching the seamless tube with sprayed water and then placing the seamless tube in an air atmosphere, which is at room temperature.

Once the seamless tube of low-carbon steel is at room temperature, the seamless tube is tempered until the temperature of the seamless tube reaches about 500° C. Upon reaching a temperature of about 500° C., the tube is cooled to room temperature by placing the tube in an air atmosphere, which is at room temperature.

The seamless tube of low-carbon steel heat treated by this process has a tensile strength of at least about 130,000 psi, a yield strength of at least about 104,000 psi, and an elongation at break of at least about 14%. The seamless tube of low-carbon steel heat treated by this process also remains ductile at temperatures down to about −40° C. By "ductile", it is meant that when stress is applied to the seamless tube of low-carbon steel effective to cause the seamless tube to fracture, the seamless tube demonstrates substantial plastic deformation before fracturing. Preferably, the seamless tube of low-carbon steel yields plastically at least about 5% before fracturing, when stress effective to cause the seamless tube to so yield is applied to the seamless tube.

In contrast to the low-carbon steel tube of the present invention, a tube formed from a conventional low-carbon steel, such as 1010 low-carbon steel, by conventional tube forming processes becomes brittle as the temperature of the conventional low-carbon steel lowers. For example, at temperatures of about −40° C., a tube of 1010 low-carbon steel is brittle and fractures with little or no permanent deformation (i.e., yields plastically less than 5%) when a stress effective to cause the 1010 low-carbon steel tube to so yield is applied to the 1010 low-carbon steel tube.

Figure 5:
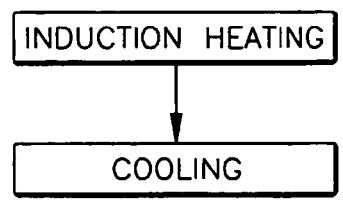
FIG. 5 is a schematic block diagram illustrating another embodiment of the heat treatment step of FIG. 3.

In another embodiment of the present invention, as shown schematically in FIG. 5, the cold drawn seamless tube of low-carbon steel is heat treated by transferring the cold drawn seamless tube to a heating chamber of an induction furnace and induction heating the seamless tube to a temperature of at least about 900° C. and, preferably, about 920° C. The heat is supplied to the heating chamber of the induction furnace by an electrical coil that surrounds the induction heating chamber.

The seamless tube of low-carbon steel is maintained at a temperature of at least about 900° C. within the heating chamber for at least about 15 minutes. Preferably, the seamless tube is maintained at a temperature of at least about 900° C. within the heating chamber for at least about 20 minutes.

The seamless tube of low-carbon steel after being heated within the heating chamber of the induction furnace for at least about 15 minutes is cooled to room temperature. The seamless tube is preferably cooled to room temperature by quenching the tube with sprayed water and then placing the seamless tube in an air atmosphere, which is at room temperature.

It was found that the seamless tube in this heat treatment process did not have to be tempered, after quenching, in order to improve the toughness of the seamless tube at low temperatures.

The seamless tube of low-carbon steel heat treated by this process has a tensile strength of at least about 130,000 psi, a yield strength of at least about 104,000 psi, and an elongation at break of at least about 14%.

Surprisingly, it was found that the seamless steel of low-carbon steel heat treated by this process remains ductile at temperatures down to about −100° C. It is believed that the induction furnace heats the seamless tube of low-carbon steel at a quicker rate and more uniformly than a conventional fuel furnace, and that this quicker and more uniform heating provides the seamless tube of low-carbon steel with its improved ductility down to −100° C.

The heat treated seamless tube of low-carbon steel is cut to length and welded to an end cap, such as 22, of low-carbon steel and an end wall, such as 38, of low-carbon steel. The end wall is also welded to a diffuser, such as 52, of low-carbon steel. The low-carbon steel employed in the end cap, the end wall, and diffuser preferably consists essentially of, by weight, about 0.07% to about 0.12% carbon, about 0.70% to about 1.60% manganese, up to about 0.020% phosphorous, up to about 0.015% sulfur, about 0.06% to about 0.35% silicon, about 0.25% to about 1.20% chromium, up to about 0.65% nickel, about 0.20% to about 0.70% molybdenum, up to about 0.35% copper, about 0.02% to about 0.06% aluminum, up to about 0.05% vanadium, up to about 0.25% residual elements, and the balance iron.

The heat-treated seamless tube cut to length, end cap, end wall, and diffuser are welded together by any suitable means, such as friction welding, autogenous gas tungsten arc welding, electron beam welding, or laser welding. Preferably, the seamless tube, end cap, end wall, and diffuser are welded together by laser welding.

EXAMPLE

A low-carbon steel tube was prepared from a cylindrical billet of low-carbon steel. The cylindrical billet had a length of about 3 meters and a diameter of about 190 millimeters. The cylindrical billet of low-carbon steel was cast from a low-carbon steel that consists essentially of, by weight, about 0.07% to about 0.12% carbon, about 0.70% to about 1.60% manganese, up to about 0.020% phosphorous, up to about 0.015% sulfur, about 0.06% to about 0.35% silicon, about 0.25% to about 1.20% chromium, up to about 0.65% nickel, about 0.20% to about 0.70% molybdenum, up to about 0.35% copper, about 0.02% to about 0.06% aluminum, up to about 0.05% vanadium, up to about 0.25% residual elements, and the balance iron.

The cylindrical billet was heated to a temperature of about 1200° C. and, while at 1200° C., was passed through a rolling mill to reduce the diameter of the cylindrical billet. The diameter of the cylindrical billet was reduced by the hot-rolling from about 190 mm to about 75 mm.

The hot-rolled cylindrical billet was maintained at a temperature of about 1200° C. and, while at 1200° C., passed through a piercing mill to form a seamless tube with a uniform wall thickness along the entire axis of the tube and circumferentially entirely around the tube.

After piercing, the tube was allowed to cool until the temperature of the tube reached room temperature. Once at room temperature, the thickness of the annular wall of the tube was reduced by cold drawing the tube. The thickness of the annular wall of the tube after cold drawing was about 3 mm.

The tube was then heat treated by heating the tube in a reheating furnace to a temperature of about 920° C. for about 20 minutes. The tube was then quenched with sprayed water and cooled to room temperature (i.e., about 22° C.) by placing the tube in an air atmosphere, which was at room temperature. Once the tube was at room temperature, the tube was tempered until the temperature of the tube reached about 500° C. Upon reaching a temperature of about 500° C., the tube was cooled to room temperature by placing the tube in an air atmosphere, which was at room temperature. The cooled tube was then cut to the desired length.

The tube so formed was tested in accordance with ASTM E8/E8M and DIN/EN 10002. The tube exhibited outstanding mechanical properties including a tensile strength of at least about 130,000 psi, a yield strength of at least about 104,000 psi, and an elongation at break of at least about 14%.

The ductility of the low-carbon steel tube at a temperature of about −40° C. was also tested by performing a hydraulic burst test at about −40° C. In the burst test, a sample of the low-carbon steel tube was cooled to a temperature of about −40° C. by placing the sample of the low-carbon steel tube in an ethyl alcohol bath that was mixed with dry ice. The temperature of the sample was measured with a thermocouple connected to a Fluke temperature indicator. Once the temperature of sample decreased to about −40° C., the sample was removed from the bath and connected to a Haskel Hydropneumatic High Pressure Pump. An ethyl alcohol pressure medium, which was maintained at a temperature of about −40° C., was pumped by the high pressure pump into the low-carbon steel tube to increase the pressure within the low-carbon steel tube. The pressure within the low-carbon steel tube was measured using a Dynisco pressure transducer connected to a Daytronic strain gauge conditioner with a peak pressure detector. The pressure within the low-carbon steel tube was increased until the low-carbon steel tube burst. The time to burst was between about 20 and 30 seconds.

Figure 6:
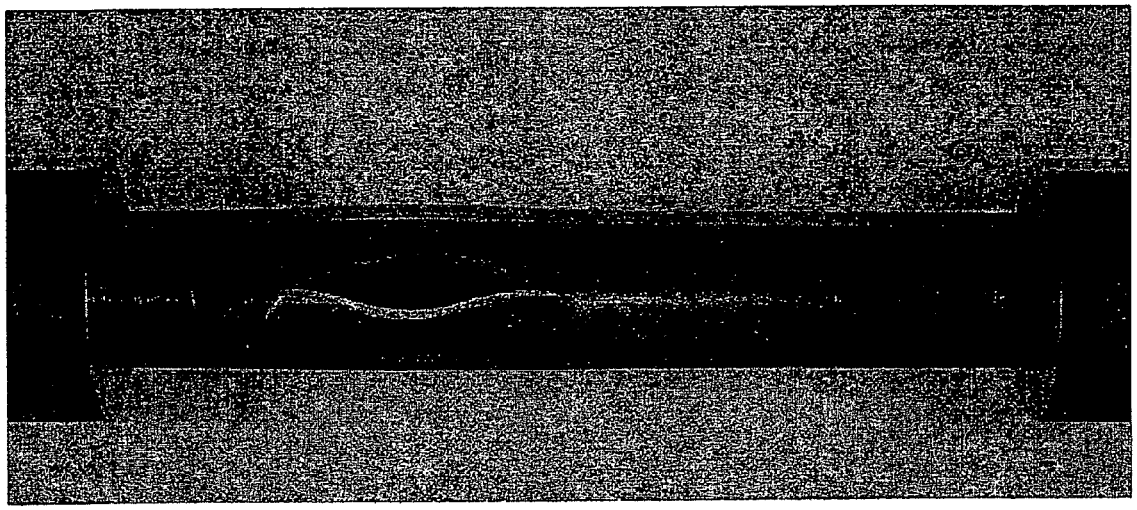
FIG. 6 is a picture showing the results of a burst test performed at −40° C. on a seamless tube prepared in accordance with the present invention.

FIG. 6 is a picture showing the area where the low-carbon steel tube burst. A visual inspection showed that there was no fracture propagation beyond the bulged area where the low-carbon steel tube burst. The absence of fracture propagation beyond the bulged area where the low-carbon steel tube burst indicates that the low-carbon steel tube remained ductile at a temperature down to about −40° C.

The low carbon steel tube was also tested for susceptibility to hydrogen embrittlement and stress corrosion cracking.

The tube cut to the desired length was laser welded to an end cap, such as 22, of low-carbon steel and an end wall, such as 38, of low-carbon steel. The end wall was also welded to a diffuser, such as 52, of low-carbon steel. The composition of the low-carbon steel employed in the end cap, end wall, and diffuser was selectively controlled such that the low-carbon steel consists essentially of, by weight, about 0.07% to about 0.12% carbon, about 0.70% to about 1.60% manganese, up to about 0.020% phosphorous, up to about 0.015% sulfur, about 0.06% to about 0.35% silicon, about 0.25% to about 1.20% chromium, up to about 0.65% nickel, about 0.20% to about 0.70% molybdenum, up to about 0.35% copper, about 0.02% to about 0.06% aluminum, up to about 0.05% vanadium, up to about 0.25% residual elements, and the balance iron.

A c-ring type specimen was removed from the welded portion of the housing and placed in a 3% NaCl saturated air atmosphere. The c-ring type specimen was maintained at 25° C. and subjected to 1.5V from a Ag/AgCl hydrogen cathode charging mechanism (NACE TM0177 Method C). Stress equivalent to 100% of the actual yield strength was applied to the c-ring sample for one month.

Analysis by thermal absorption spectrometry and scanning electron microscopy revealed no evidence of hydrogen embrittlement in the welded portion or base metal surrounding the welded portion of the c-ring type specimen after the one month period.

Additionally, a c-ring type specimen was removed from a welded portion of the housing and placed in a 3% NaCl saturated air atmosphere at 80° C. (NACE TM0177 Method C). Stress equivalent to 100% of the actual yield strength was applied to the c-ring sample for one month.

Analysis by thermal absorption spectrometry and scanning electron microscopy revealed no evidence of stress corrosion cracking in the welded portion or base metal surrounding the welded portion of the c-ring type specimen after the one month period.

Comparative Example

A comparative low-carbon steel tube was prepared from a cylindrical billet that was cast using a low-carbon steel that had the same composition as the low-carbon steel of the example.

The process for producing the comparative low-carbon steel tube from the cylindrical billet, however, differed from the process of the example.

In the process, a cylindrical billet, which had a length of about 3 meters and a diameter of about 190 millimeters, was heated to a temperature of about 1200° C. and, while at 1200° C., was passed through a piercing mill to form a seamless tube with a uniform wall thickness along the entire axis of the tube and circumferentially entirely around the tube.

After piercing, the tube was allowed to cool until it reached room temperature. Once at room temperature, the thickness of the annular wall of the tube was reduced by cold drawing the tube. The thickness of the annular wall of the tube after cold drawing was about 3 mm.

The tube was annealed at a temperature of about 520° C. for about 45 minutes, cooled to room temperature, and cut to the desired length.

The comparative low-carbon steel tube so formed was tested in accordance with ASTM E8/E8M and DIN/EN 10002. The tube exhibited outstanding mechanical properties including a tensile strength of at least about 130,000 psi, a yield strength of at least about 104,000 psi, and an elongation at break of at least about 14%.

The ductility of the comparative low-carbon steel tube at a temperature of about −40° C. was also tested by performing a burst test at about −40° C. on the comparative low-carbon steel tube. In the burst test, a sample of the comparative low-carbon steel tube was cooled to a temperature of about −40° C. by placing the sample of the comparative low-carbon steel tube in an ethyl alcohol bath that was mixed with dry ice. The temperature of the sample was measured with a thermocouple connected to a Fluke temperature indicator. Once the temperature of sample decreased to about −40° C., the sample was removed from the bath and connected to a Haskel Hydropneumatic High Pressure Pump. An ethyl alcohol pressure medium, which was maintained at a temperature of about −40° C., was pumped by the high pressure pump into the comparative low-carbon steel tube to increase the pressure within the comparative low-carbon steel tube. The pressure within the comparative low-carbon steel tube was measured using a Dynisco pressure transducer connected to a Daytronic strain gauge conditioner with a peak pressure detector. The pressure within the comparative low-carbon steel tube was increased until the comparative low carbon steel tube burst. The time to burst was between about 20 and 30 seconds.

Figure 7:
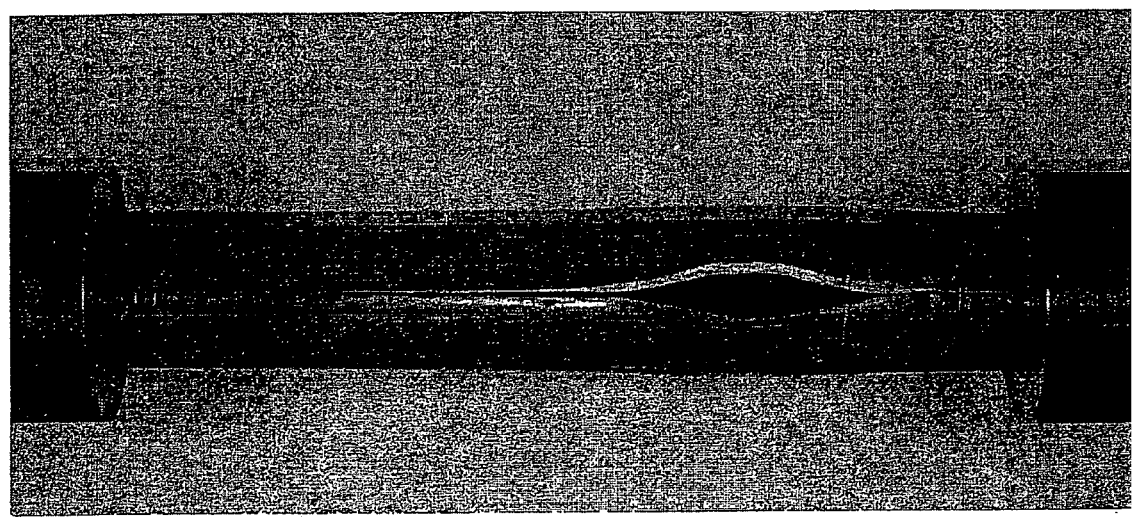
FIG. 7 is a picture showing the results of a burst test performed at −40° C. on a comparative seamless tube.

FIG. 7 is a picture showing the area where the comparative low-carbon steel tube burst. A visual inspection showed that there was fracture propagation beyond the bulged area where the low-carbon steel tube burst. The presence of fracture propagation beyond the bulged area where the low-carbon steel tube burst indicates that the low-carbon steel tube was brittle at temperatures of about −40° C.

From the above description of the invention, those skilled in the art will perceive improvements, changes and modifications. Examples of changes include changes in the steel composition and changes in the processing of the steel composi- Having described the invention, the following is claimed:

1. An apparatus comprising a cold drawn induction-heated low-carbon steel tube, wherein the low-carbon steel tube is cold-drawn prior to induction heating, said low-carbon steel tube yielding plastically more than about 5% before fracturing at temperatures down to about −100° C. when stress sufficient to cause said low carbon steel tube to so yield is applied to said low-carbon steel tube, said low-carbon steel tube being formed from a low-carbon steel that consists essentially of, by weight, about 0.07% to about 0.12% carbon, about 0.70% to about 1.60% manganese, up to about 0.020% phosphorous, up to about 0.015% sulfur, about 0.06% to about 0.35% silicon, about 0.25% to about 1.20% chromium, up to about 0.65% nickel, about 0.20% to about 0.70% molybdenum, up to about 0.35% copper, about 0.02% to about 0.06% aluminum, up to about 0.05% vanadium, up to about 0.25% residual elements, and the balance iron.

2. The apparatus of claim 1, wherein said low-carbon steel tube has a tensile strength of at least about 130,000 psi, a yield strength of at least about 104,000 psi, and an elongation at break of at least about 14%.

3. The apparatus of claim 1, wherein the low-carbon steel tube is seamless.

4. A method comprising the steps of:
casting a billet of low-carbon steel, said billet of low-carbon steel having a first diameter and consists essentially of, by weight, about 0.07% to about 0.12% carbon, about 0.70% to about 1.60% manganese, up to about 0.020% phosphorous, up to about 0.015% sulfur, about 0.06% to about 0.35% silicon, about 0.25% to about 1.20% chromium, up to about 0.65% nickel, about 0.20% to about 0.70% molybdenum, up to about 0.35% copper, about 0.02% to about 0.06% aluminum, up to about 0.05% vanadium, up to about 0.25% residual elements, and the balance iron;
reducing the diameter of said billet of low-carbon steel by hot-rolling said billet,
forming a tube having an annular wall by piercing said billet;
reducing the thickness of said annular wall to a first thickness by cold drawing said tube,
induction heating said tube after said cold drawing to form a low-carbon steel tube that yields plastically more than about 5% before fracturing at temperatures down to about −100° C. when stress sufficient to cause said low carbon steel tube to so yield is applied to said low-carbon steel tube.

5. The method of claim 4, wherein the step of induction heating consists of induction heating said tube to a temperature of about 900° C.

6. The method of claim 4, wherein the low-carbon steel tube has a tensile strength of at least about 130,000 psi, a yield strength of at least about 104,000 psi, and an elongation at break of at least about 14%.

* * * * *